United States Patent
Tian et al.

(10) Patent No.: US 12,212,098 B2
(45) Date of Patent: Jan. 28, 2025

(54) CONNECTOR WITH EASY-TO-UNLOCK GROOVE STRUCTURE

(71) Applicant: Aptiv Technologies AG, Schaffhausen (CH)

(72) Inventors: Xiaoxian Tian, Shanghai (CN); Haifei Guan, Shanghai (CN); Yingquan Jing, Shanghai (CN)

(73) Assignee: Aptiv Technologies AG, Schaffhausen (CH)

( * ) Notice: Subject to any disclaimer, the term of this patent is extended or adjusted under 35 U.S.C. 154(b) by 353 days.

(21) Appl. No.: 17/732,723

(22) Filed: Apr. 29, 2022

(65) Prior Publication Data
US 2022/0393399 A1 Dec. 8, 2022

(30) Foreign Application Priority Data
Apr. 30, 2021 (CN) .......................... 202110485974.3

(51) Int. Cl.
*H01R 13/639* (2006.01)
*H01R 13/502* (2006.01)
(Continued)

(52) U.S. Cl.
CPC ......... *H01R 13/639* (2013.01); *H01R 13/502* (2013.01); *H01R 13/6273* (2013.01); *H01R 13/641* (2013.01)

(58) Field of Classification Search
CPC .......................... H01R 13/639; H01R 13/502; H01R 13/6273; H01R 13/641; H01R 13/6272; H01R 13/629; H01R 13/46; Y02T 10/70
See application file for complete search history.

(56) References Cited

U.S. PATENT DOCUMENTS 5,947,763 A * 9/1999 Alaksin ................ H01R 13/641
439/352
9,762,002 B1 * 9/2017 Matsumoto .......... H01R 13/641
(Continued)

FOREIGN PATENT DOCUMENTS

CN 211743556 U 10/2020
CN 212849073 U 3/2021
(Continued)

OTHER PUBLICATIONS

Extended European Search Report, for Application No. 22170858.9, dated Sep. 26, 2022., 9 pages.

*Primary Examiner* — Abdullah A Riyami
*Assistant Examiner* — Nader J Alhawamdeh
(74) *Attorney, Agent, or Firm* — Billion & Armitage

(57) ABSTRACT

A connector and a connector assembly are provided. The connector includes a housing and a locking/unlocking mechanism arranged on the housing that is configured to lock and unlock a connection between the connector and a mating connector. The locking/unlocking mechanism includes a cantilever structure arranged on a top surface of the housing and having a fixed end and a free end, with a pressing portion for unlocking being located adjacent to the free end and an unlocking prevention mechanism including a protection beam and a pair of protection walls. The protection beam spans over the cantilever. The pair of protection walls are arranged on both sides of the pressing portion of the cantilever. Each protection wall is provided with a first groove at a location close to the protection beam.

20 Claims, 3 Drawing Sheets

(51) Int. Cl.
    *H01R 13/627*   (2006.01)
    *H01R 13/641*   (2006.01)

(56)         References Cited

U.S. PATENT DOCUMENTS 10,784,625 B2*   9/2020   Narama .............. H01R 13/641
 2004/0023564 A1*   2/2004   Yamamoto ......... H01R 13/6272
                                                           439/701
 2011/0008989 A1    1/2011   Amano et al.
 2013/0237084 A1    9/2013   Kon et al.
 2015/0295354 A1*  10/2015   Morello ............. H01R 13/6272
                                                           439/352
 2020/0136311 A1*   4/2020   Narama .............. H01R 13/639
 2022/0393399 A1*  12/2022   Tian .................... H01R 13/502

FOREIGN PATENT DOCUMENTS

CN          113571962  A      10/2021
    EP            3703196  A1      9/2020
    JP         2019057413  A       4/2019

* cited by examiner

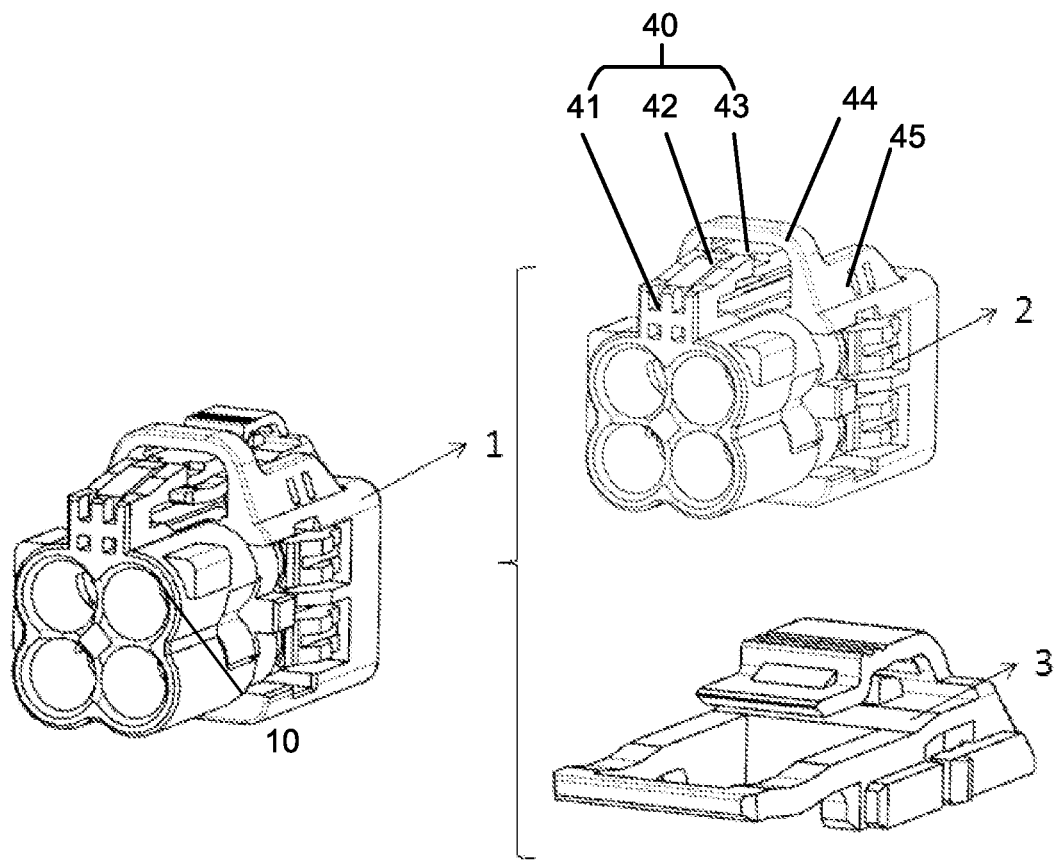
Fig. 1A
PRIOR ART
Fig. 1B
PRIOR ART
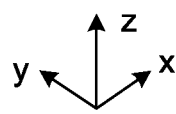

CONNECTOR WITH EASY-TO-UNLOCK GROOVE STRUCTURE

CROSS-REFERENCE TO RELATED APPLICATION

This application claims benefit of priority to Chinese Patent Application No. 202110485974.3 filed on Apr. 30, 2021, the entire disclosure of which is hereby incorporated by reference.

TECHNICAL FIELD OF THE INVENTION

The present disclosure relates to the technical field of connectors, and in particular, to a connector with an easy-to-unlock groove structure.

BACKGROUND

In the electrical connection industry, it is a customary practice to develop a connector containing male terminal and a connector containing female terminal, which are to be mated and locked together, and can be unlocked by pressing its lock structure. As shown in FIGS. 1A and 1B, a connector assembly 1 consists of a connector 2 and a connector positioning assurance (CPA) device 3. By inserting and connecting the connector 2 and another mating connector (not shown), a terminal 10 in the connector 2 is electrically connected with a matting terminal in the mating connector. The CPA device 3 can be used to be installed on the top of the housing of the connector 2 for positioning and double locking when the connector 2 is inserted. In some cases (for example, in the case where the assurance force can be satisfied by the locking implemented by the housing of the connector 2), the CPA device 3 can be omitted.

The connector 2 includes a housing, and a locking/unlocking mechanism arranged on the top of the housing. The locking/unlocking mechanism is configured to lock and unlock a connection between the connector 2 and a mating connector (not shown). The locking/unlocking mechanism comprises a cantilever structure 40 arranged on a top surface of the housing. The cantilever structure 40 includes a fixed end 41 and a free end 42 and a pressing portion 43 for unlocking is formed at the freed end 42 of the cantilever structure. When unlocking, the pressing portion 43 is to be pressed down (in negative Z-axis direction) by fingers to release the locking, so that the connector 2 can be pulled out from the mating connector. A protection beam 44 is provided above the cantilever structure 40, and protection walls 45 are provided on both sides of the pressing portion 43 to prevent the pressing portion 43 from being pressed by mistake.

In order to ensure the effectiveness of the locking/unlocking mechanism, an accidental bending prevention test (sometimes referred to as pencil test) can be carried out on the connector assembly 1 or the connector 2. For example, when performing the pencil test of a certain entire vehicle manufacturer, a rod-shaped object with a length greater than an interval between said two protection walls 45 is placed across these two protection walls 45 in an orientation parallel to the protection beam 44, the rod-shaped object is then rolled down from the protection beam 44 to the rear side (the protection wall 45 side), and a determination is then made about whether the rod-shaped object has triggered an unlocking action of the pressing portion 43 during the rolling down process. This can ensure that the connector assembly 1 or the connector 2 is less likely to be unlocked by false triggering.

However, with the miniaturization of the connector, the interval between the protection walls 45 that satisfies the pencil test becomes smaller and smaller, making it difficult to press the pressing portion 43 using a finger.

SUMMARY

The present disclosure provides a connector and a connector assembly.

In accordance with one aspect of the present disclosure, a connector, comprising: a housing; and a locking/unlocking mechanism arranged on the housing and configured to lock and unlock a connection between the connector and a mating connector, wherein the locking/unlocking mechanism includes: a cantilever structure arranged on a top surface of the housing and having a fixed end and a free end, with a pressing portion for unlocking being located adjacent to the free end; and an unlocking prevention mechanism including a protection beam and a pair of protection walls, wherein the protection beam spans over the cantilever, wherein the pair of protection walls are arranged on both sides of the pressing portion of the cantilever, wherein each protection wall is provided with a first groove at a location close to the protection beam.

In accordance with another aspect of the present disclosure, a connector assembly is provided. The connector assembly includes the connector described above and a connector position assurance device arranged on a top surface of the connector and including a base and fixing arms located on both sides, wherein the fixing arms extend from the base and pass under the protection beam to clamp the cantilever structure.

BRIEF DESCRIPTION OF THE DRAWINGS

The drawings illustrate generally, by way of example, but not by way of limitation, various embodiments discussed in the present document. In the drawings, which are not necessarily drawn to scale, like numerals may describe similar components in different views.

FIGS. 1A and 1B are schematic diagrams of a connector assembly according to the prior art;

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Figure 2:
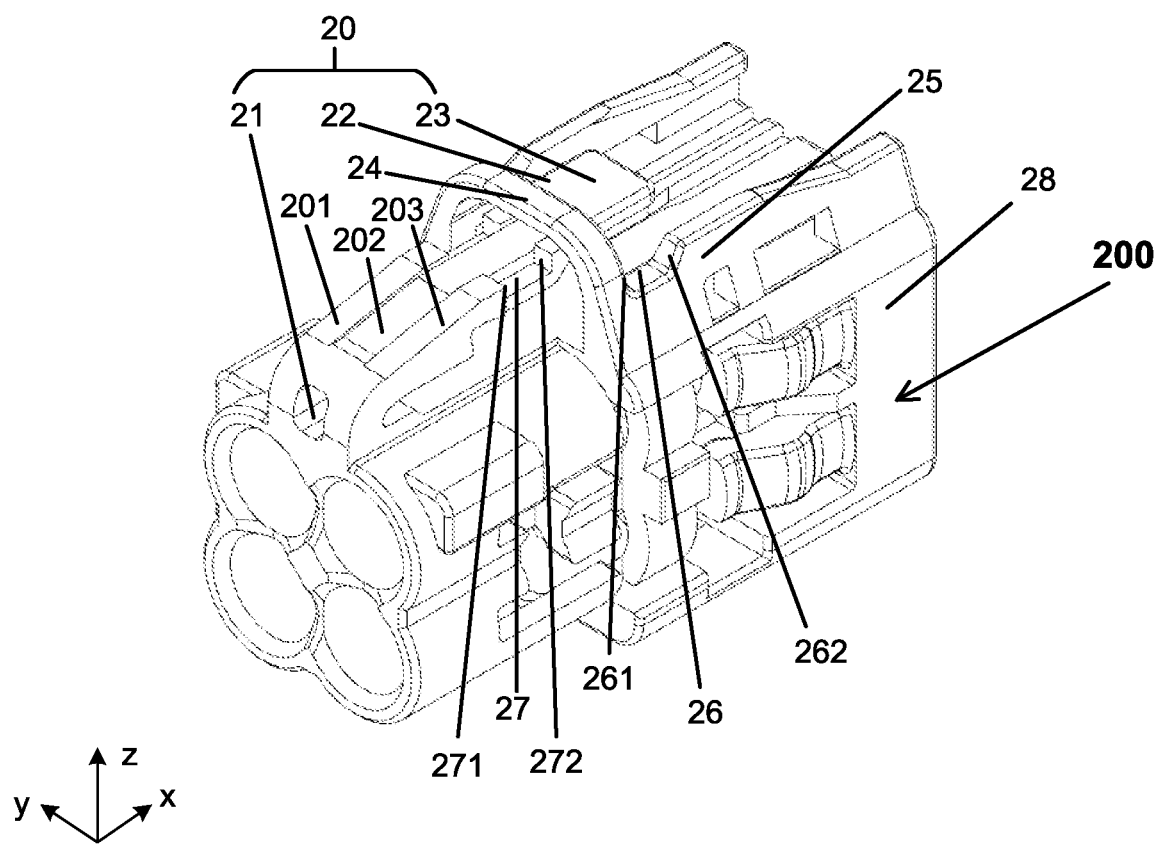
FIG. 2 is a diagram illustrating the structure of the connector in accordance with an embodiment.

The present disclosure improves the above structure to make the miniaturized connector assembly 100 or the connector 200 to be easily unlocked by finger. FIG. 2 is a diagram illustrating the structure of the connector 200 in accordance with an exemplary embodiment.

As shown in FIG. 2, the connector 200 may include a locking/unlocking mechanism provided at the top of the housing 28 for locking and unlocking a connection between the connector assembly 100 and a mating connector. The locking/unlocking mechanism may comprise a cantilever structure 20 having a fixed end 21 and a free end 22, with a pressing portion 23 for unlocking located near the free end 22.

The locking/unlocking mechanism may further include an unlocking prevention device including a protection beam 24 and a pair of protection walls 25. The protection beam 24 spans above the cantilever structure 20, and the pair of protection walls 25 (only one of them is marked in FIG. 2) are arranged on both sides of the pressing portion 23 of the cantilever structure 20. The protection walls 25 can be connected with the protection beam 24 or can be provided separately.

In this embodiment, unlike the protection wall shown in FIG. 1, the protection wall 25 on each side is provided with a first groove 26 at a location close to the protection beam 24. Each first groove 26 has a proximal groove wall 261 and a distal groove wall 262, wherein the proximal groove wall 261 is closer to the protection beam 24 than the distal groove wall 262. By arranging the first grooves 26 on the protection walls 25 on both sides as described above, the space for the finger to press down (for example, by pressing down using a fingertip) can be provided and the pressing stroke can be increased, as a result, the unlock of the miniaturized connector 200 becomes easier and it is more ergonomic. Distances of the proximal groove walls 261 of the first grooves 26 on both sides from the protection beam 24 are basically the same, so as to facilitate the insertion of a finger. In some embodiments, the proximal groove wall 261 may be adjacent to (adjoin) the protection beam 24 as shown in FIG. 2, so that the finger can be pressed directly downward along the protection beam 24.

A groove width (along the X-axis direction) between the proximal groove wall 261 and the distal groove wall 262 of the first groove 26 should not be too small or too large. If the groove width is too small, the requirement for a finger to insert cannot be satisfied, and if the groove width is too large, the pencil test cannot be passed. In some embodiments, the distal groove wall 262 of the first groove 26 is separated from the protection beam 24 by a distance no greater than a distance by which the free end 22 of the cantilever is separated from the protection beam 24. In other words, the first groove 26 is contained within the cantilever in the extension direction of the cantilever.

To achieve unlocking prevention, with respect to the top surface of the housing 28 of the connector 200, a height of at least one portion of the protection wall 25 is greater than a height of the pressing portion 23 of the cantilever. It is desired that the at least one portion, the height of which is higher than the height of the pressing portion 23, is located on both sides of the pressing portion 23. Here, it is noted that FIG. 2 shows an example where the protection wall 25 extends to the end of the rear side of the housing (positive X-axis direction), but it should be understood that the protection wall 25 may only extend beyond the rear side end of the pressing portion 23.

A preferred structure of cantilever will be further described. The cantilever structure 20, in a width direction, includes two lateral locking arms 201, 203 and a central thinner arm portion 202. The locking arms 201, 203 are located on both sides of the cantilever. The central thinner arm portion 202 is located between these two lateral locking arms 201, 203. The top surface of the thinner arm portion 202 is lower than the top surfaces of the locking arms 201, 203.

Each of the lateral locking arms 201, 203 includes a second groove 27 at a position along in a direction perpendicular to the extension direction (X-axis direction) of the cantilever. In particular, this position for second groove 27 is located between the fixed end 21 and the pressing portion 23 of the cantilever in the extension direction of the cantilever. The second groove 27 is used to realize an engagement with a mating end of a mating connector, so that the connector 200 cannot be pulled out from the mating connector in a locked state. The second groove 27 has a proximal groove wall 271 and a distal groove wall 272. The proximal groove wall 271 is closer to the fixed end 21 than the distal groove wall 272. The bottom of the second groove 27 is formed to be lower than the top surface of the central thinner arm portion 202. Thus, when the connector 200 is inserted into the mating connector, the top surface of the thinner arm portion 202 can abut against the opposite surface of the mating connector to generate a sound indicative of the completion of the installation.

In some embodiments, the proximal groove wall 271 of each second groove 27 has substantially the same distance from the fixed end 21 of the cantilever.

Figure 3:
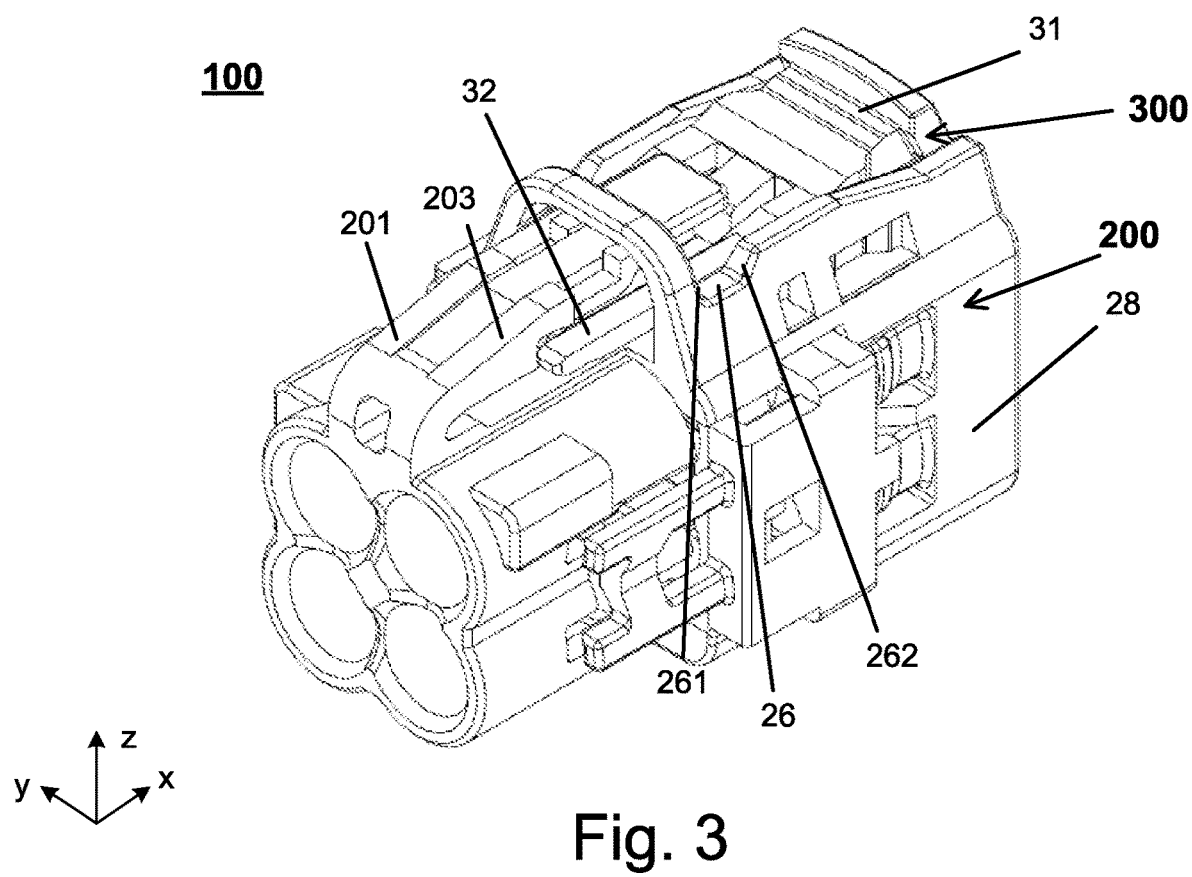
FIG. 3 is a diagram illustrating the structure of the connector assembly in accordance with an embodiment.

FIG. 3 is a diagram illustrating the structure of the connector assembly 100 in accordance with an exemplary embodiment. The connector assembly 100 is consisting of the connector 200 and the CPA device 300.

The CPA device 300 is installed on the top of connector 200 and includes a base 31 and fixing arms 32 on both sides. The fixing arms 32 extend from the base 31 to the front (in negative X-axis direction) along the extension direction of the cantilever and passes under the protection beam 24 to clamp the lateral locking arms 201, 203 of the cantilever structure 20. The structure of the connector 200 is the same as the example shown in FIG. 2.

In the case where the CPA device 300 is assembled, since the pressing stroke of the fingertip will be blocked by the fixing arm 32, in some embodiments, with respect to the top surface of the housing 28, a height of the bottom of the first groove 26 is greater than a height of the corresponding portion of the fixing arm 32 of the CPA device 300 in its extension direction.

In the above, the connector can be connectors in various forms. These connectors include but are not limited to a female connector, a male connector, a plug connector, or a socket connector, etc. When the connector is determined, the mating connector can be a connector that can be paired with it for operation. For example, as a non-limiting example, if the connector is a female connector, the mating connector may be a male connector, and vice versa. Alternatively, if the connector is a plug connector, the mating connector can be a socket connector, and vice versa.

The preferred embodiments of the present invention have been described above in detail. However, it should be understood that various embodiments and modifications may be employed in the present invention without departing from its broad spirit and scope. Those skilled in the art can make many modifications and changes according to the concept of the present invention without creative work. Therefore, all those technical schemes that the skilled in the art can obtain through logical analysis, reasoning, or limited experiment on the basis of prior art according to conception of the present invention should be within the protection range determined by the claims of the present invention.

The preferred embodiments of the present invention have been described above in detail. However, it should be understood that various embodiments and modifications may be employed in the present invention without departing from its broad spirit and scope. Those skilled in the art can make many modifications and changes according to the concept of the present invention without creative work. Therefore, all those technical schemes that the skilled in the art can obtain through logical analysis, reasoning, or limited experiment on the basis of prior art according to conception of the present invention should be within the protection range determined by the claims of the present invention.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A connector, comprising:
   a housing; and
   a locking/unlocking mechanism arranged on the housing and configured to lock and unlock a connection between the connector and a mating connector, wherein the locking/unlocking mechanism includes:
   a cantilever structure arranged on a top surface of the housing and having a fixed end and a free end, a pressing portion for unlocking being located adjacent to the free end; and an unlocking prevention mechanism including a protection beam and a pair of protection walls, wherein the protection beam spans over the cantilever, wherein the pair of protection walls are arranged on both sides of the pressing portion of the cantilever, wherein each protection wall is provided with a first groove at a location close to the protection beam, wherein each first groove has a proximal groove wall and a distal groove wall, and wherein the proximal groove wall is closer to the protection beam than the distal groove wall, a distance of the proximal groove wall of each first groove from the protection beam is basically the same, a groove width between the proximal groove wall and the distal groove wall of each first groove is less than a predetermined value to meet an accidental bending prevention test.

2. The connector in accordance with claim 1, wherein the connector is a female connector or a male connector.

3. The connector in accordance with claim 1, wherein the connector is a plug connector or a socket connector.

4. A connector assembly, comprising:
   the connector in accordance with claim 1, and
   a connector position assurance device arranged on a top surface of the connector and including a base and fixing arms located on both sides, wherein the fixing arms extend from the base and pass under the protection beam to clamp the cantilever structure.

5. The connector assembly in accordance with claim 4, wherein with respect to the top surface of the housing, a height of a bottom of the first groove is greater than a height of a corresponding portion of the fixing arm of the connector position assurance device.

6. A connector, comprising:
   a housing; and
   a locking/unlocking mechanism arranged on the housing and configured to lock and unlock a connection between the connector and a mating connector, wherein the locking/unlocking mechanism includes:

a cantilever structure arranged on a top surface of the housing and having a fixed end and a free end, a pressing portion for unlocking being located adjacent to the free end; and an unlocking prevention mechanism including a protection beam and a pair of protection walls, wherein the protection beam spans over the cantilever, wherein the pair of protection walls are arranged on both sides of the pressing portion of the cantilever, wherein each protection wall is provided with a first groove at a location close to the protection beam, wherein a proximal groove wall of each of the first grooves is arranged adjacent to the protection beam, wherein each first groove has a proximal groove wall and a distal groove wall, and wherein the proximal groove wall is closer to the protection beam than the distal groove wall, wherein a distance of the distal groove wall of each first groove from the protection beam is no greater than a distance of the free end of the cantilever from the protection beam, wherein with respect to the top surface of the housing, a height of at least one portion of each of the protection walls is greater than a height of the pressing portion of the cantilever.

7. The connector in accordance with claim 6, wherein the at least one portion of each of the protection walls is located on both sides of the pressing portion of the cantilever.

8. A connector assembly, comprising:
the connector in accordance with claim 6, and
a connector position assurance device arranged on a top surface of the connector and including a base and fixing arms located on both sides, wherein the fixing arms extend from the base and pass under the protection beam to clamp the cantilever structure.

9. The connector assembly in accordance with claim 8, wherein with respect to the top surface of the housing, a height of a bottom of the first groove is greater than a height of a corresponding portion of the fixing arm of the connector position assurance device.

10. The connector in accordance with claim 6, wherein a proximal groove wall of each of the first grooves is arranged adjacent to the protection beam.

11. The connector in accordance with claim 6, wherein the connector is a female connector or a male connector.

12. The connector in accordance with claim 6, wherein the connector is a plug connector or a socket connector.

13. A connector, comprising:
a housing; and
a locking/unlocking mechanism arranged on the housing and configured to lock and unlock a connection between the connector and a mating connector, wherein the locking/unlocking mechanism includes:

a cantilever structure arranged on a top surface of the housing and having a fixed end and a free end, a pressing portion for unlocking being located adjacent to the free end; and an unlocking prevention mechanism including a protection beam and a pair of protection walls, wherein the protection beam spans over the cantilever, wherein the pair of protection walls are arranged on both sides of the pressing portion of the cantilever, wherein each protection wall is provided with a first groove at a location close to the protection beam, wherein the cantilever comprises:

two lateral locking arms located on both sides of the cantilever and each having a second groove perpendicular to an extension direction of the cantilever, wherein each of the second grooves is located between the fixed end and the pressing portion of the cantilever; and a central thinner arm portion located between said two locking arms, with its top surface being lower than top surfaces of the locking arms.

14. The connector in accordance with claim 13, wherein each of the second grooves is located below the protection beam.

15. The connector in accordance with claim 14, wherein a bottom of each second groove is lower than the top surface of the thinner arm portion.

16. A connector assembly, comprising:
the connector in accordance with claim 13, and
a connector position assurance device arranged on a top surface of the connector and including a base and fixing arms located on both sides, wherein the fixing arms extend from the base and pass under the protection beam to clamp the cantilever structure.

17. The connector assembly in accordance with claim 16, wherein with respect to the top surface of the housing, a height of a bottom of the first groove is greater than a height of a corresponding portion of the fixing arm of the connector position assurance device.

18. The connector in accordance with claim 13, wherein a proximal groove wall of each of the first grooves is arranged adjacent to the protection beam.

19. The connector in accordance with claim 13, wherein the connector is a female connector or a male connector.

20. The connector in accordance with claim 13, wherein the connector is a plug connector or a socket connector.

* * * * *